(12) United States Patent
Wobben

(10) Patent No.: US 7,621,049 B2
(45) Date of Patent: Nov. 24, 2009

(54) METHOD FOR THE PRODUCTION OF A CONNECTION FLANGE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 342 days.

(21) Appl. No.: 11/293,872

(22) Filed: Dec. 2, 2005

(65) Prior Publication Data

US 2006/0163874 A1 Jul. 27, 2006

Related U.S. Application Data

(63) Continuation-in-part of application No. PCT/EP2004/002862, filed on Mar. 19, 2004.

(30) Foreign Application Priority Data

Jun. 2, 2003 (DE) ................ 103 25 032

(51) Int. Cl.
*B21K 23/04* (2006.01)
(52) U.S. Cl. ............ 29/897.33; 29/897.3; 29/897
(58) Field of Classification Search ........ 29/33 R, 29/897, 897.31, 897.312, 897.33, 897.3
See application file for complete search history.

(56) References Cited

U.S. PATENT DOCUMENTS

| | | | | |
|---|---|---|---|---|
| 1,489,640 | A | * | 4/1924 | Jacocks .................. 219/107 |
| 2,491,878 | A | * | 12/1949 | Spagnola ............... 29/890.048 |
| 3,101,532 | A | | 8/1963 | Christensen |
| 4,643,457 | A | * | 2/1987 | Press ..................... 285/55 |
| 4,795,137 | A | | 1/1989 | Witt |
| 4,857,693 | A | * | 8/1989 | Rump .................... 219/76.12 |

FOREIGN PATENT DOCUMENTS

| | | |
|---|---|---|
| CN | 2049563 U | 12/1989 |
| DE | 561 772 | 9/1932 |
| DE | 32 31 932 A1 | 3/1984 |
| DE | 101 26 049 A1 | 12/2002 |
| JP | 56055181 U | 5/1981 |
| JP | 57005585 U | 1/1982 |
| JP | 58-11186 U | 1/1983 |
| JP | 2-93403 | 7/1990 |
| JP | 11280159 A | 12/1999 |
| WO | WO 00/71856 A1 | 11/2000 |

* cited by examiner

*Primary Examiner*—David E Bochna
(74) *Attorney, Agent, or Firm*—Seed Intellectual Property Law Group PLLC

(57) ABSTRACT

A method for the production of an annular connection flange includes producing the annular connection flange from an element in the form of a circular ring. The element in the form of a circular ring has a substantially triangular profile.

7 Claims, 8 Drawing Sheets

METHOD FOR THE PRODUCTION OF A CONNECTION FLANGE

CROSS-REFERENCE TO RELATED APPLICATION

This application claims priority from the International Application PCT/EP2004/002862, filed Mar. 19, 2004, which application is incorporated herein by reference in its entirety.

BACKGROUND OF THE INVENTION

1. Field of the Invention

DE 101 26 049 A1 already discloses an annular connection flange having a tubular portion for mounting to an end of a tubular component, in particular for a pylon segment for constructing a pylon of a wind power installation, wherein it is formed with a flange collar radially adjoining one end of the portion and having a flange surface oriented axially away from the tubular portion.

2. Description of the Related Art

To produce such an annular connection flange, the state of the art uses an element in the form of a circular ring which is substantially quadrangular in its cross-section (profile) and that element in the form of the circular ring is then machined so that the annular connection flange is left. In the machining operation material is removed from the element in the form of the circular ring, in a not insignificant amount, in order then to obtain in the cross-section (profile), the desired profile of the annular connection flange, in one piece. It is therefore accordingly known for a connection flange to be turned in one piece from a metal semifinished product, to produce the connection flange.

Above-mentioned DE 101 26 049 also discloses an annular connection flange in which the outside wall of the tubular portion is conical, in particular for mounting to a component which is also conical.

BRIEF SUMMARY OF THE INVENTION

The invention is based on the realization that, at its free end, the flange collar has to transmit only relatively low forces and possibly even no forces at all. Therefore in terms of the strength and the stability of the connection flange, it is harmless if the thickness of the flange collar at its free end is less than in the region where the flange collar forms a transition into the tubular portion. That can also provide that the starting material which can be used for production of the connection flange is not for example just a segment in the form of a circular ring which is of a substantially rectangular cross-sectional configuration, but it can also be substantially of a triangular cross-section.

The particular advantage is that in that way the cutting or turning operations for producing the connection flange from the semifinished product are considerably reduced. When the semifinished product is of a substantially triangular cross-section, it is also markedly better than a previous semifinished product because at the initial stage the semifinished product does not need to have as much material as hitherto. Further configurations are the subject-matter of the appendant claims.

BRIEF DESCRIPTION OF THE SEVERAL VIEWS OF THE DRAWING(S)

FIG. 1 shows a semifinished product in accordance with the state prior of the art, FIG. 2 shows a semifinished product according to the invention of substantially triangular cross-section, FIG. 3 shows a semifinished product according to the invention with a concave surface, FIGS. 4 and 5 show semifinished products of a first embodiment, FIGS. 6 and 7 show semifinished products of a second embodiment, FIGS. 8 and 9 show semifinished products of a third embodiment, FIGS. 10 and 11 show a fourth embodiment of the semifinished products, and FIG. 12 shows a workpiece from which two flanges are produced.

DETAILED DESCRIPTION OF THE INVENTION

Figure 1:
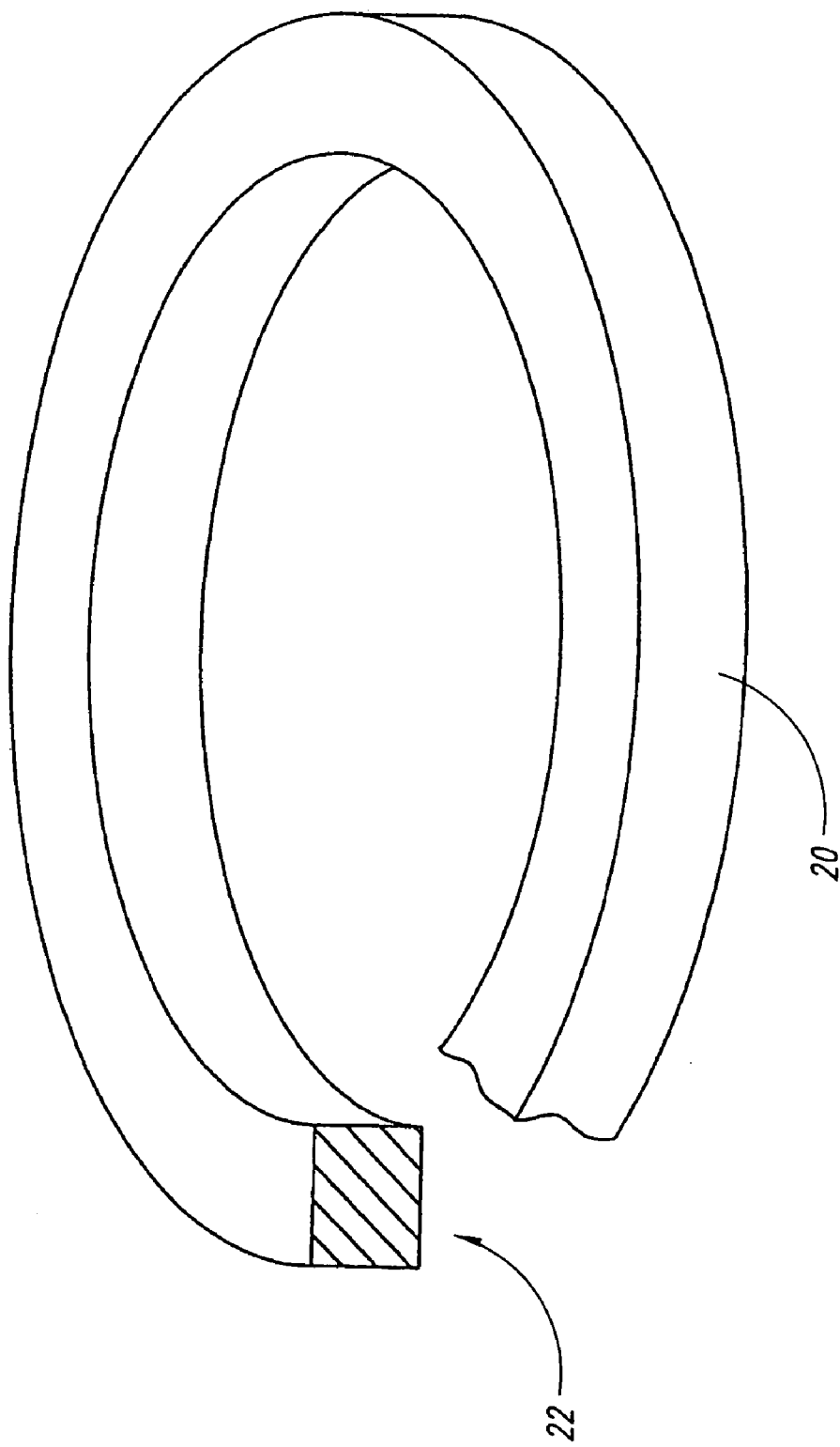

FIG. 1 shows a semifinished product 20 as is used in the state of the art, of a rectangular cross-section, from which the flange is produced. It can be seen that the semifinished product 20 is generally of rectangular or square cross-sectional shape 22. The final product to be produced is similar to that shown in FIG. 15.

Figure 2:
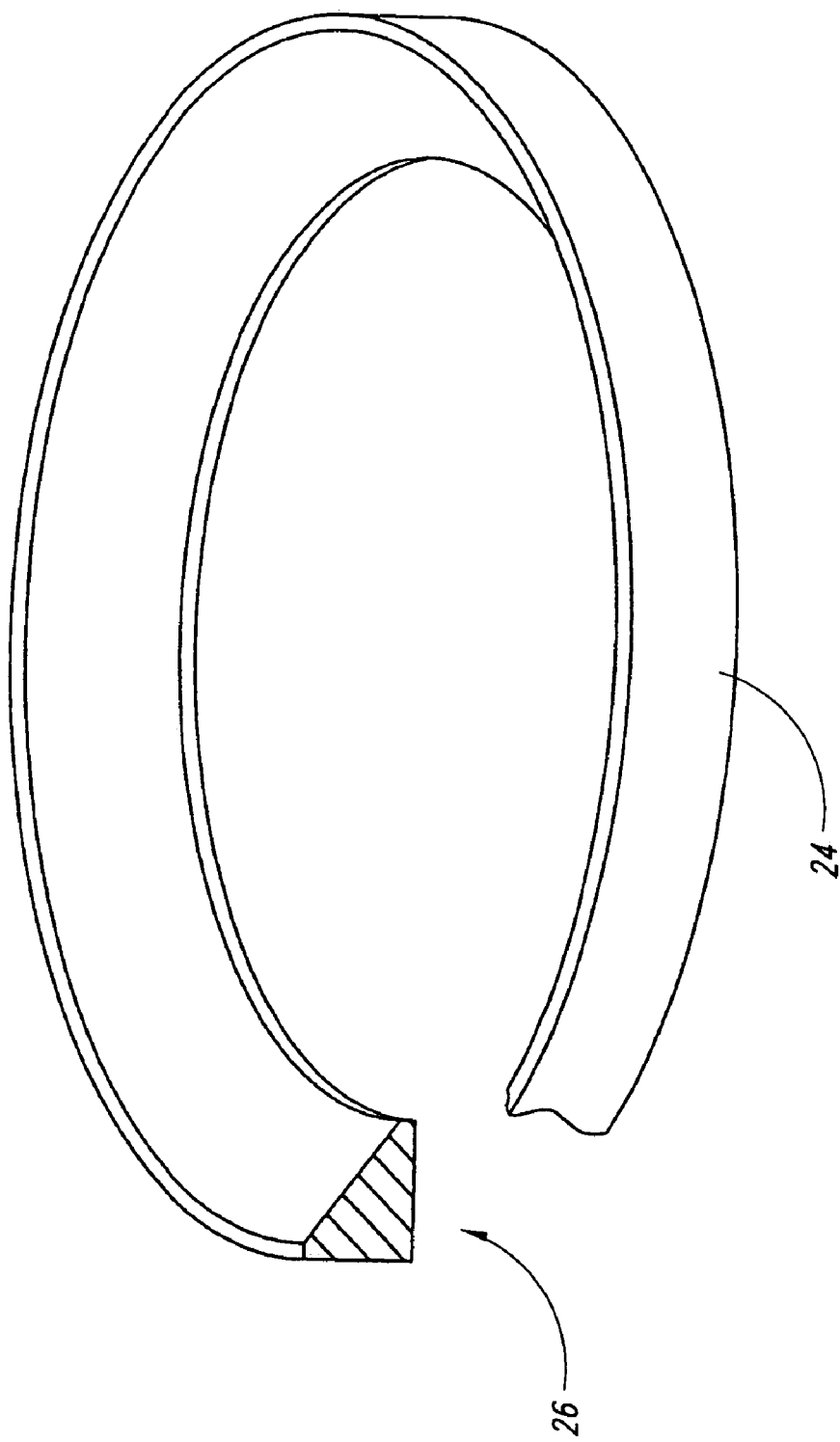
Figure 3:
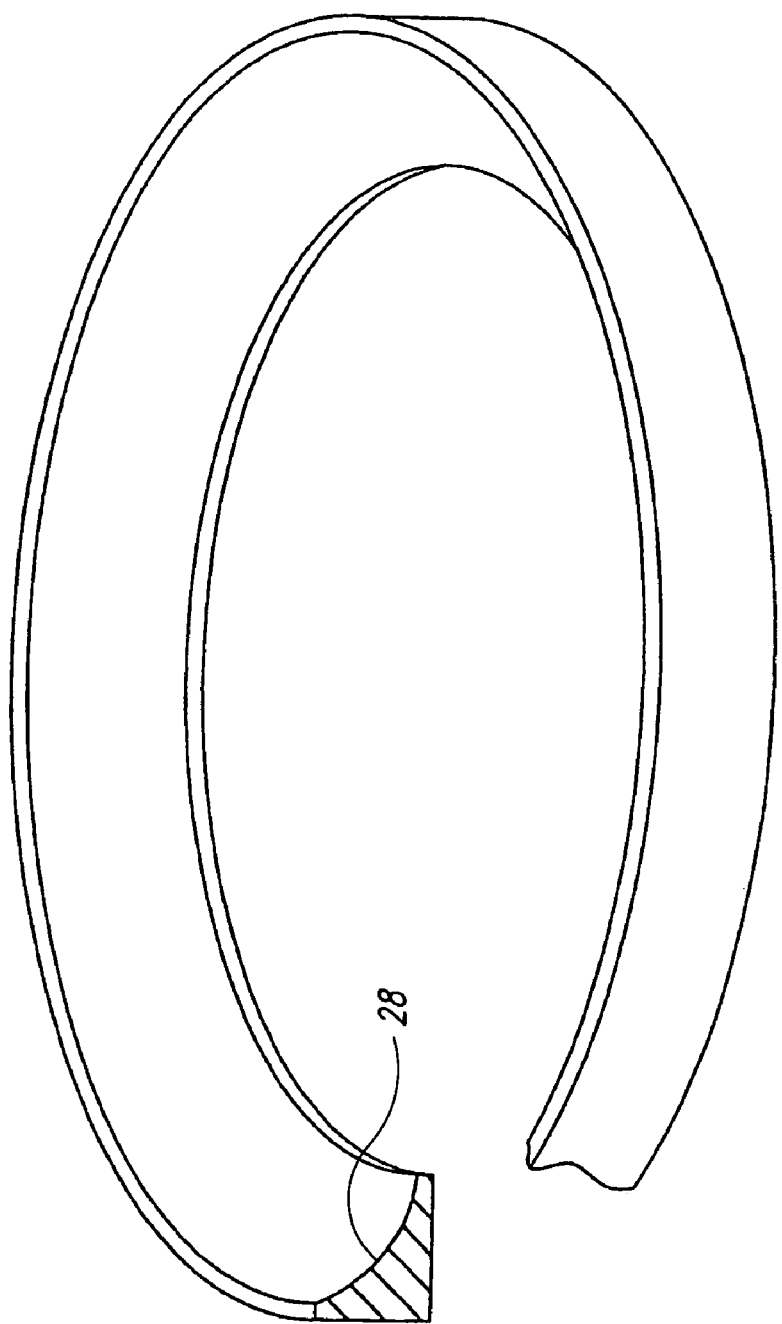

FIG. 2 shows a semifinished product 24 according to the invention of substantially triangular cross-section 26, wherein the hypotenuse of the triangle is straight. FIG. 3, instead of a straight hypotenuse, illustrates an arc 28, thus affording a concave surface portion.

Figure 4:
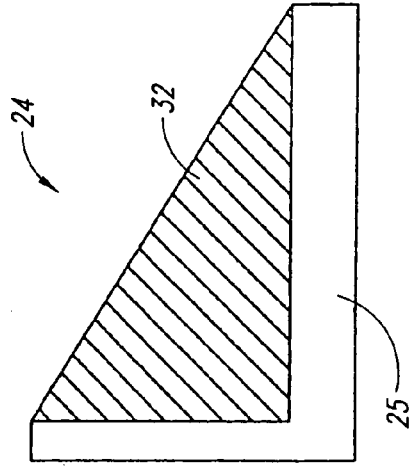

FIG. 4 shows a first embodiment, according to the state of the art. The semifinished product 20 is illustrated as being rectangular in this Figure and a broken line 30 indicates what region of that semifinished product is not needed in accordance with the invention from the outset.

Figure 5:
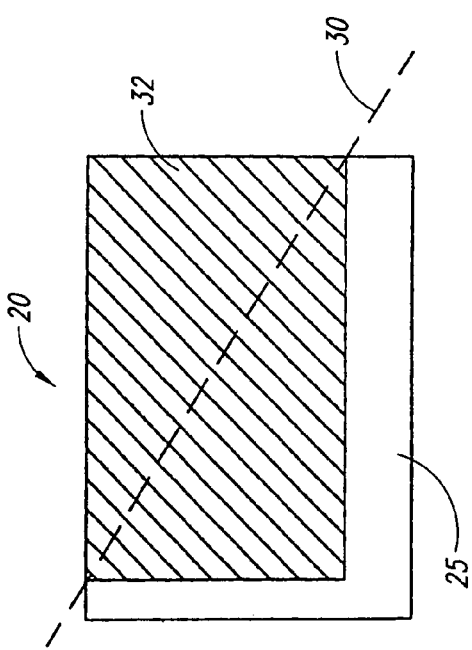

FIG. 5 is a view in cross-section through a corresponding semifinished product 24 after having been cut along line 30. In the remaining FIGS. 4-12, those regions 32 which have to be removed to obtain the final product are shown in cross-hatched. They can be removed by any acceptable method, such as by machining, grinding or other known methods to remove metal.

Figure 6:
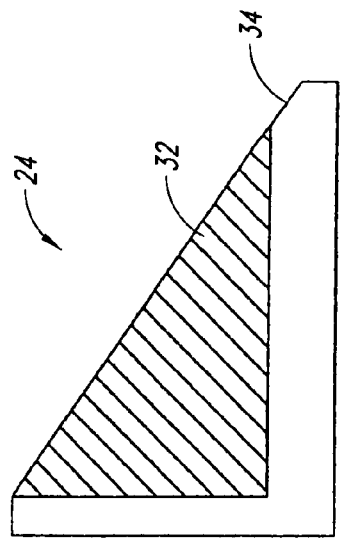
Figure 7:
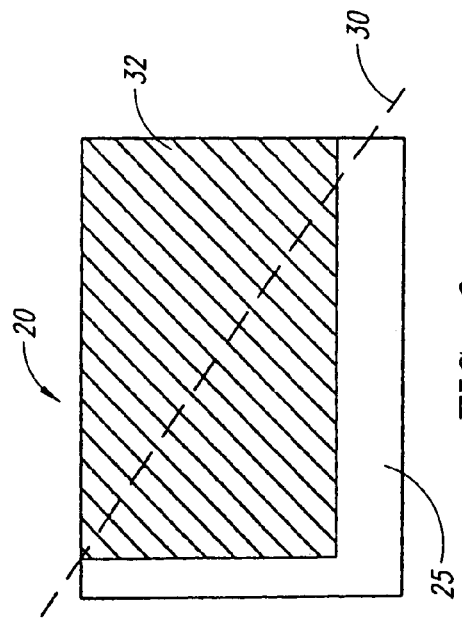

The views in FIGS. 6 and 7 are comparable to those in FIGS. 4 and 5. The difference is that, in FIGS. 6 and 7, the inner edge 34 of the flange ring is no longer rectangular but of a bevelled configuration.

Figure 8:
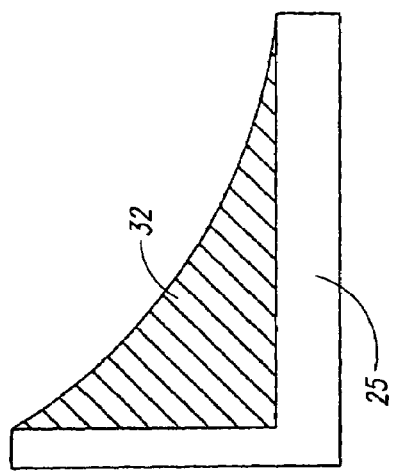
Figure 9:
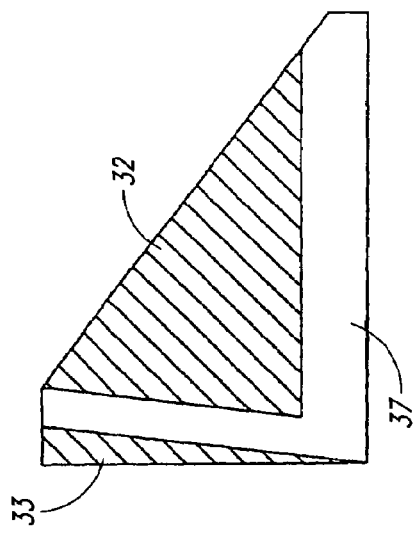

FIGS. 8 and 9 show a comparable embodiment to that shown in FIGS. 4 and 5, but with a concave surface portion instead of a straight surface.

Figure 10:
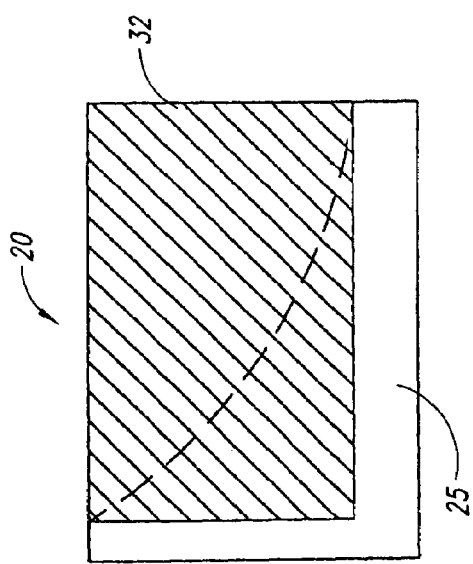
Figure 11:
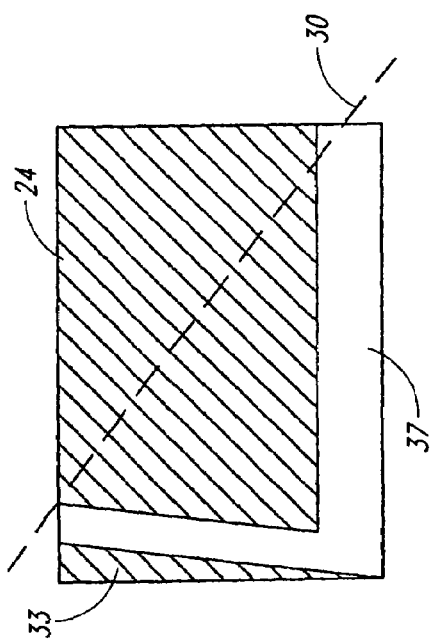

FIGS. 10 and 11 show an embodiment with an inclined flange 35. Some material 33 is cut from the back surface of the semifinished product 24.

Figure 12:
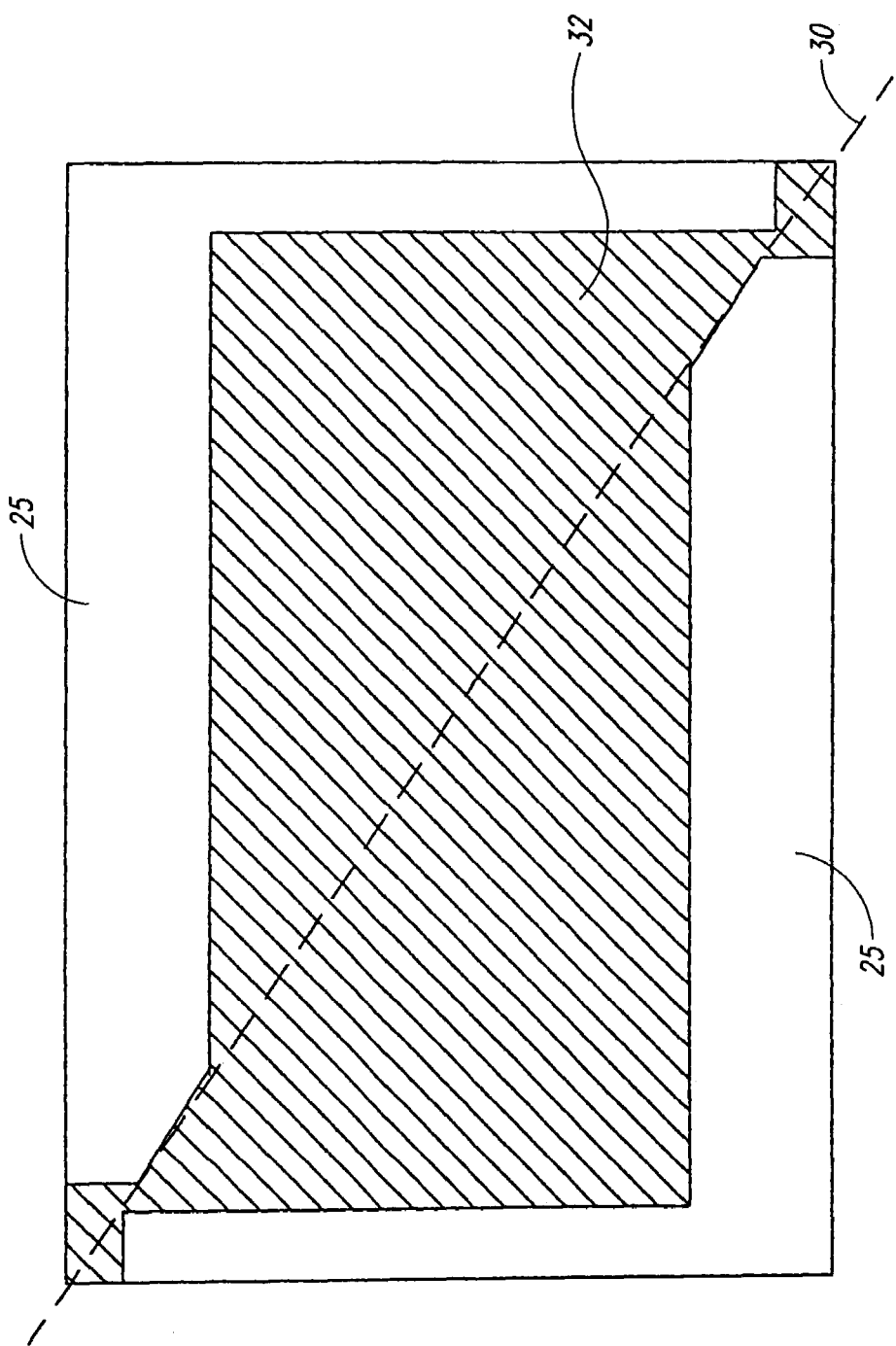

FIG. 12 again shows a right-angled semifinished product and illustrates how two flanges can be obtained from a single semifinished product. According to one method of the present invention, a rectangular cross-section flange is cut in half along a diagonal line 30 as shown in FIG. 12. After this, each half has the section 32 removed by acceptable metal working techniques. Thus, the current method can obtain two flanges in place of the one flange that was obtained in the prior art.

Figure 13:
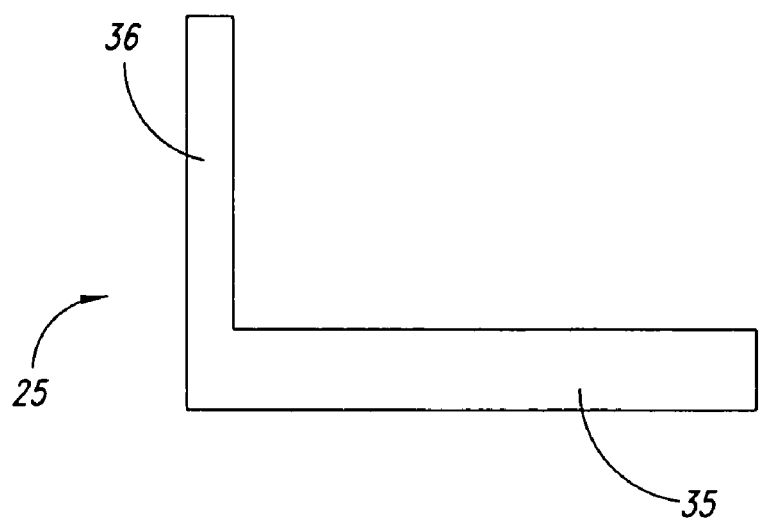
FIG. 13 is an example of a finished product according to principles of the present invention.
Figure 14:
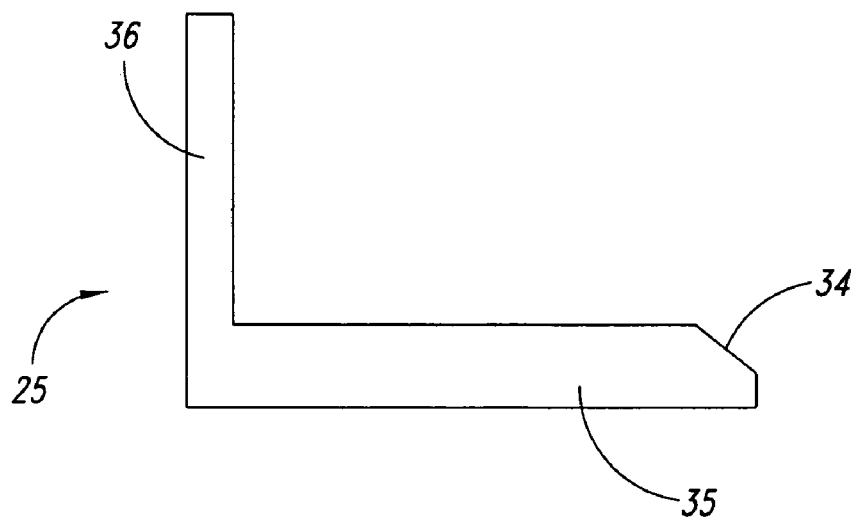
FIG. 14 is an alternative embodiment of a finished product according to principles of the present invention.

FIGS. 13 and 14 show completed finished products prior to use in the structure of the type described in DE 101 26 049 A1.

The structure therefore includes an L-shaped flange 25 having a first end 35 and an upstanding leg 36. In the embodiment of FIG. 14, the leg 35 has a beveled edge 34.

Figure 15:
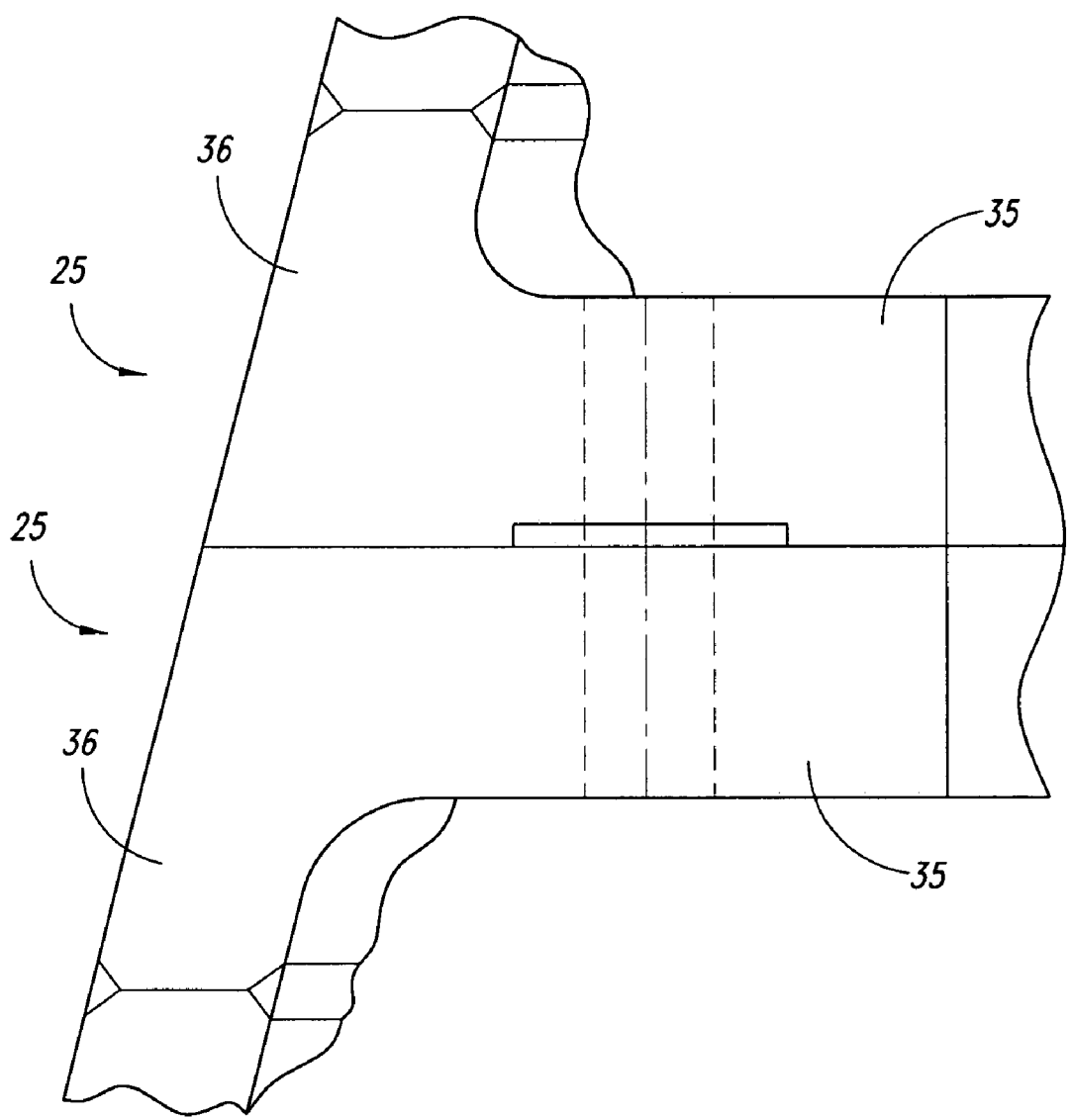
FIG. 15 is an embodiment showing the flange of the present invention in the final structure.

FIG. 15 is an example of the flange 25 as used in a completed construction. This Figure is taken from DE 101 26 049 A1. The flange 25 is mounted in a completed structure to provide connection and support. Leg ends 35 extend inward and vertical arms 36 are along the outer surface. The flange 25 is connected by welding, bolting or other appropriate technique to the end structure.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for the production of an annular flange, comprising:

providing a circular ring having a rectangular cross-sectional profile;

cutting the circular ring having the rectangular cross-sectional profile substantially in half to define the circular ring having a substantially triangular cross-sectional profile; and removing material from the circular ring having the substantially triangular cross-sectional profile to form an annular flange having a substantially L-shaped cross-sectional profile.

2. The method of claim 1, wherein at least one side of the substantially triangular cross-sectional profile is arcuate.

3. The method of claim 1, wherein at least one corner of the substantially triangular cross-sectional profile does not extend to a single vertex.

4. The method of claim 3, wherein at least two corners of the substantially triangular cross-sectional profile do not extend to respective single vertices.

5. The method of claim 1, wherein removing material from the circular ring includes machining the circular ring to form the annular flange.

6. The method of claim 1, wherein the annular flange includes a beveled edge.

7. The method of claim 1, wherein the annular flange includes a tubular portion that is inclined with respect to a central axis of the annular flange.

* * * * *

UNITED STATES PATENT AND TRADEMARK OFFICE
CERTIFICATE OF CORRECTION

| | | |
|---|---|---|
| PATENT NO. | : 7,621,049 B2 | Page 1 of 1 |
| APPLICATION NO. | : 11/293872 | |
| DATED | : November 24, 2009 | |
| INVENTOR(S) | : Wobben | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 699 days.

Signed and Sealed this

Ninth Day of November, 2010

David J. Kappos
*Director of the United States Patent and Trademark Office*